United States Patent [19]

Lemcoff et al.

[11] Patent Number: 5,176,722
[45] Date of Patent: Jan. 5, 1993

[54] PRESSURE SWING ADSORPTION METHOD FOR SEPARATING GASEOUS MIXTURES

[75] Inventors: Norberto C. Lemcoff, Livingston; Robert C. Gmelin, Cranford, both of N.J.

[73] Assignee: The BOC Group, Inc., New Providence, N.J.

[21] Appl. No.: 708,932

[22] Filed: Jun. 5, 1991

Related U.S. Application Data

[63] Continuation-in-part of Ser. No. 540,040, Jun. 19, 1990, abandoned.

[51] Int. Cl.$^5$ .............................................. B01D 53/04
[52] U.S. Cl. ............................................ 55/26; 55/58; 55/62; 55/68; 55/75
[58] Field of Search .............. 55/25, 26, 58, 62, 68, 55/75, 161–163, 179, 389

[56] References Cited

U.S. PATENT DOCUMENTS

| | | | |
|---|---|---|---|
| 3,338,030 | 8/1967 | Feldbauer, Jr. | 55/58 X |
| 3,738,087 | 6/1973 | McCombs | 55/58 |
| 3,797,201 | 3/1974 | Tamura | 55/62 |
| 3,923,477 | 12/1975 | Armond et al. | 55/68 X |
| 3,960,522 | 6/1976 | Munzner et al. | 55/68 |
| 4,168,149 | 9/1979 | Armond et al. | 55/58 X |
| 4,264,339 | 4/1981 | Jüntgen et al. | 55/58 X |
| 4,348,213 | 9/1982 | Armond | 55/58 X |
| 4,376,640 | 3/1983 | Vo | 55/58 X |
| 4,404,004 | 9/1983 | Knoblauch et al. | 55/62 X |
| 4,415,340 | 11/1983 | Knoblauch et al. | 55/58 X |
| 4,431,432 | 2/1984 | Amitani et al. | 55/58 X |
| 4,440,548 | 4/1984 | Hill | 55/62 X |
| 4,468,238 | 8/1984 | Matsui et al. | 55/58 X |
| 4,482,362 | 11/1984 | Yamazaki et al. | 55/62 |
| 4,519,813 | 5/1985 | Hagiwara et al. | 55/58 X |
| 4,539,020 | 9/1985 | Sakuraya et al. | 55/58 X |
| 4,840,647 | 6/1989 | Hay | 55/58 X |
| 4,925,461 | 5/1990 | Gemba et al. | 55/58 X |

Primary Examiner—Robert Spitzer
Attorney, Agent, or Firm—Colman R. Reap; Larry R. Cassett; David A. Draegert

[57] ABSTRACT

The present invention is a method for separating a gaseous mixture to produce an enriched gas having a predetermined purity which comprises the steps of (a) passing the gaseous mixture into a first adsorption bed at an adsorption pressure in the range from about 15 psig to about 500 psig, (b) withdrawing enriched gas from the first adsorption bed and passing the enriched gas into a product reservoir, (c) when the purity of the enriched gas from the first adsorption bed drops below the predetermined purity thereby becoming lean gas, passing the lean gas from the first adsorption bed into a second adsorption bed to substantially equalize the pressure of the bed, (d) stopping the flow of lean gas from the first adsorption bed and evacuating the first adsorption bed while purging the first adsorption bed by passing enriched gas from the product reservior into the first adsorption bed, (e) further pressurizing the second adsorption bed by passing enriched gas from the product reservoir into the second adsorption bed to back fill the second adsorption bed, (f) further pressurizing the second adsorption bed by passing the gaseous mixture into the second asdorption bed at an adsorption pressure in the range from about 15 psig to about 500 psig, and (g) repeating the above steps in a continuous cycle treating the second adsorption bed like the first adsorption bed and the first adsorption bed like the second adsorption bed.

12 Claims, 5 Drawing Sheets

PRESSURE SWING ADSORPTION METHOD FOR SEPARATING GASEOUS MIXTURES

This is a continuation-in-part of application, Ser. No. 07/540,040, filed Jun. 19, 1990, now abandoned.

BACKGROUND OF THE INVENTION

1. Field of the Invention

The present invention is directed to a method for separating a gaseous mixture to produce an enriched gas. More particularly, the present invention is directed to an improved pressure swing adsorption method for separating gaseous mixtures which comprises an adsorption step, a pressure equalization step, a back fill step, and an evacuation and purge step.

2. Description of the Prior Art

Pressure swing adsorption (PSA) is a well known method for separating gaseous mixtures. Pressure swing adsorption involves passing a gaseous mixture at an elevated pressure through a bed of an adsorbent material which selectively adsorbs one or more of the components of the gaseous mixture. Product gas, enriched in the unadsorbed gaseous component(s), is then withdrawn from the bed. The adsorption bed may be regenerated by reducing the pressure of the bed.

The term "gaseous mixture", as used herein, refers to a gaseous mixture, such as air, primarily comprised of two components having different molecular size. The term "enriched gas" refers to a gas comprised of the component(s) of the gaseous mixture relatively unadsorbed after passage of the gaseous mixture through the adsorbent bed. The enriched gas generally must meet a predetermined purity level, for example, from about 90% to about 99.9%, in the unadsorbed component(s). The term "lean gas" refers to a gas exiting from the adsorption bed that fails to meet the predetermined purity level set for the enriched gas.

The selectivity of the adsorbent material may depend on a difference in either adsorption kinetics or adsorption equilibrium. The selectivity of carbon molecular sieves is generally governed by the volume of the pore size and the distribution of that pore size in the adsorbent. Gaseous molecules with a kinetic diameter less than, or equal to, the pore size of the adsorbent are adsorbed and retained in the adsorbent while gaseous molecules with a diameter larger than the pore size of the adsorbent pass through the adsorbent. The adsorbent thus sieves the gaseous molecules according to their molecular size. The adsorbent may also separate molecules according to their different rates of diffusion in the pores of the adsorbent.

Zeolite molecular sieves adsorb gaseous molecules with some dependence upon crystalline size. In general, adsorption into zeolite is fast and equilibrium is reached typically in a few seconds. The sieving action of zeolite is generally dependent upon the difference in the equilibrium adsorption of the different components of the gaseous mixture. When air is separated by a zeolite adsorbent, nitrogen is preferentially adsorbed over oxygen and the pressure swing adsorption method may be employed to produce an oxygen enriched product.

The sieving action of carbon molecular sieves is generally not dependent upon differences in equilibrium adsorption but rather by differences in the rate of adsorption of the different components of the gaseous mixture. When air is separated by carbon molecular sieves, oxygen is preferentially adsorbed over nitrogen and the pressure swing adsorption method may be employed to produce a nitrogen enriched product.

As a gaseous mixture travels through a bed of adsorbent, the adsorbable gaseous components of the mixture enter and fill the pores of the adsorbent. After a period of time, the composition of the gas exiting the bed of adsorbent is essentially the same as the composition entering the bed. This is known as the break-through point. At some time prior to this breakthrough point, the adsorbent bed must be regenerated. Regeneration involves stopping the flow of gaseous mixture through the bed and purging the bed of the adsorbed components generally by venting the bed to the atmosphere.

A pressure swing adsorption system generally employs two adsorbent beds operated on cycles which are sequenced to be out of phase with one another by 180° so that when one bed is in the adsorption step, the other bed is in the regeneration step. The two adsorption beds may be connected in series or in parallel. In a serial arrangement, the gas exiting the outlet end of the first bed enters the inlet end of the second bed. In a parallel arrangement, the gaseous mixture enters the inlet end of all beds comprising the system. Generally, a serial arrangement of beds is preferred for obtaining a high purity gas product and a parallel arrangement of beds is preferred for purifying a large quantity of a gaseous mixture in a short time cycle.

As used herein, the term "adsorption bed" refers either to a single bed or a serial arrangement of two beds. The inlet end of a single bed system is the inlet end of the single bed while the inlet end of the two bed system (arranged in series) is the inlet end of the first bed in the system. The outlet end of a single bed system is the outlet end of the single bed and the outlet end of the two bed system (arranged in series) is the outlet end of the second bed in the system. By using two adsorption beds in parallel in a system and by cycling (alternating) between the adsorption beds, product gas can be obtained continuously.

Between the adsorption step and the regeneration step, the pressure in the two adsorption beds is generally equalized by connecting the inlet ends of the two beds together and the outlet ends of the two beds together. During pressure equalization, the gas within the void spaces of the adsorption bed which has just completed its adsorption step (under high pressure) flows into the adsorption bed which has just completed its regeneration step (under low pressure) because of the pressure differential which exists between the two beds. This pressure equalization step improves the yield of the product gas because the gas within the void spaces of the bed which has just completed its adsorption step has already been enriched.

Gas separation by the pressure swing adsorption method is more fully described in "Gas Separation by Adsorption Processes", Ralph T. Yang, Ed., Chapter 7, "Pressure Swing Adsorption: Principles and Processes" Buttersworth 1987, which reference is incorporate herein by reference.

U.S. Pat. No. 4,376,640, issued to Vo, discloses a pressure swing adsorption method for separating a gaseous mixture which comprises separating a gaseous mixture in a first adsorption bed, pressurizing a second vented and evacuated adsorption bed with lean gas from the first adsorption bed at higher pressure, isolating the second bed to allow the pressurized vessel to decrease in pressure through the adsorption of the gas contained therein, separating the gaseous mixture in a second adsorption bed, and regenerating the first adsorption bed.

United Kingdom patent application no. 2,195,097A, to Garrett, discloses a pressure swing adsorption method for separating a gaseous mixture which comprises the improvement of flowing gas from the product reservoir to an adsorption bed whenever the pressure in the product reservoir exceeds that of the adsorption bed.

Japanese patent application no. Sho. 63(1988)-79714, to Hareuma, discloses a pressure swing adsorption method for separating a gaseous mixture which comprises the improvement of cycling three adsorption beds in cycle fashion under very specific pressure swing adsorption conditions.

While the above pressure swing adsorption methods provide improvements in the separation of gaseous mixtures, these methods are not entirely satisfactory. Common problems with pressure swing adsorption methods include low product yield, low product purity, the need for large amounts of adsorbent, and energy inefficient regeneration methods. Hence there is a need for improved pressure swing adsorption methods. The present invention provides such an improved pressure swing adsorption method for the separation of gaseous mixtures in high yield and high purity.

SUMMARY OF THE INVENTION

The present invention is directed to an adsorption method for separating a gaseous mixture to produce an enriched gas having a predetermined purity which comprises the steps of (a) passing the gaseous mixture into an inlet end of a first adsorption bed at an adsorption pressure in the range from about 15 psig to about 500 psig, (b) withdrawing enriched gas from an outlet end of the first adsorption bed and passing the enriched gas into a product reservoir, (c) when the purity of the enriched gas from the outlet end of the first adsorption bed drops from about 0.1% to about 10% below the predetermined purity thereby becoming lean gas, passing the lean gas from the outlet end of the first adsorption bed into an inlet end of a second adsorption bed to substantially equalize the pressure of the first adsorption bed and the second adsorption bed, wherein the pressure of the second adsorption bed is in the range from about 25% to about 50% of the adsorption pressure, (d) stopping the flow of lean gas from the outlet end of the first adsorption bed and evacuating the first adsorption bed from the inlet end to a desorption pressure from about 25 torr to about 350 torr while purging the first adsorption bed by passing enriched gas from the product reservoir into the outlet end of the first adsorption bed, (e) further pressurizing the second adsorption bed by passing enriched gas from the product reservoir into the outlet end of the second adsorption bed to back fill the second adsorption bed, wherein the pressure of the back filled second adsorption bed is in the range from about 50% to about 100% of the adsorption pressure, (f) further pressurizing the second adsorption bed by passing the gaseous mixture into the inlet end of the second adsorption bed at an adsorption pressure in the range from about 15 psig to about 500 psig, and (g) repeating the above steps in a continuous cycle treating the second adsorption bed like the first adsorption bed and the first adsorption bed like the second adsorption bed.

In a modification of the above procedure, step (c) is carried out by passing the lean gas from the outlet end of the first adsorption bed into both the inlet end and the outlet end of the second bed simultaneously to substantially equalize the pressure of the first adsorption bed and the second adsorption bed.

DETAILED DESCRIPTION OF THE INVENTION

Figure 1:
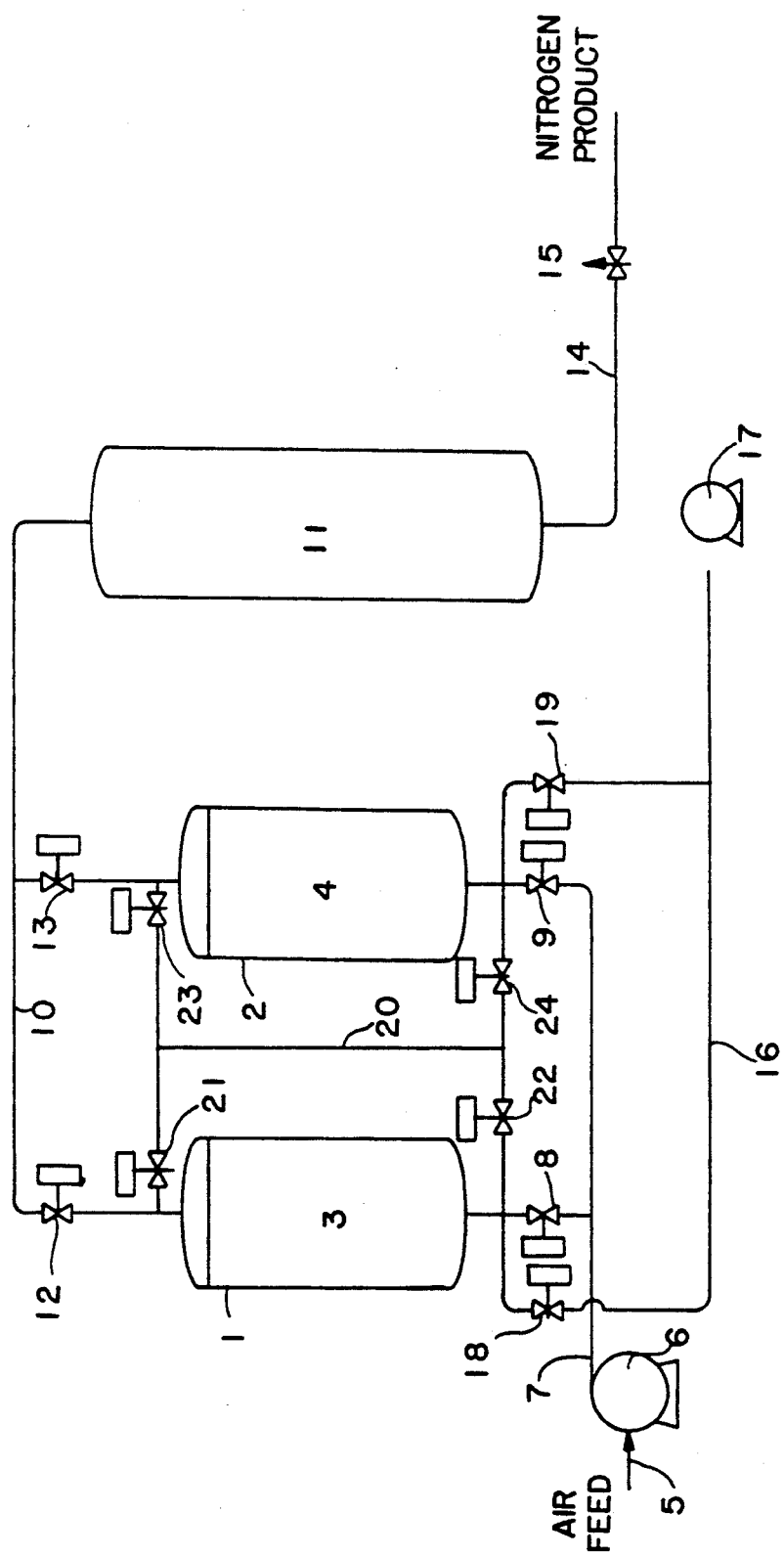
FIG. 1 is a schematic drawing of a two bed pressure swing adsorption apparatus suitable for separating gaseous mixtures according to the novel adsorption method of the present invention.

Applicant has found that the combination of a specific pressure equalization step, an evacuation and product gas purge step, and a product gas back fill step provides a pressure swing adsorption method which yields enriched gases in high yield and in high purity. The combination of the pressure equalization step, the evacuation and purge step, and the back fill step enhances the purity of the product gas and more efficiently regenerates the adsorption bed. Specifically, evacuating and purging the adsorption bed to be regenerated with enriched gas from the product reservoir desorbs more adsorbed gas permitting the bed to adsorb more gas in the next cycle. Equalizing the pressure of the adsorption beds by passing lean gas from the outlet end of the first adsorption bed into the inlet end of the second adsorption bed or into both the inlet end and the outlet end of the second adsorption bed simultaneously utilizes already enriched gas thereby improving the purity and yield of product. Back filling the adsorption bed to be regenerated with product gas after the pressure equalization step from the outlet end displaces the lean gas deeper into the bed and provides highly enriched gas at the top of the bed so that the first gas to be withdrawn from the bed is of highest purity and does not contaminate the gas in the product reservoir with impurities.

In accord with the present invention, the pressure swing adsorption method for separating a gaseous mixture to produce an enriched gas having a predetermined purity comprises the steps of (a) passing the gaseous mixture into an inlet end of a first adsorption bed at an adsorption pressure in the range from about 15 psig to about 500 psig, (b) withdrawing enriched gas from an outlet end of the first adsorption bed and passing the enriched gas into a product reservoir, (c) when the purity of the enriched gas from the outlet end of the first adsorption bed drops from about 0.1% to about 10% below the predetermined purity thereby becoming lean gas, passing the lean gas from the outlet end of the first adsorption bed into an inlet end of a second adsorption bed or simultaneously into an inlet and an outlet of a second bed to substantially equalize the pressure of the first adsorption bed and the second adsorption bed, wherein the pressure of the second adsorption bed is in the range from about 25% to about 50% of the adsorption pressure, (d) stopping the flow of lean gas from the outlet end of the first adsorption bed and evacuating the first adsorption bed from the inlet end to a desorption pressure from about 25 torr to about 350 torr while purging the first adsorption bed by passing enriched gas from the product reservoir into the outlet end of the first adsorption bed, (e) further pressurizing the second adsorption bed by passing enriched gas from the product reservoir into the outlet end of the second adsorption bed to back fill the second adsorption bed, wherein the pressure of the back filled second adsorption bed is in the range from about 50% to about 100% of the adsorption pressure, (f) further pressurizing the second adsorption bed by passing the gaseous mixture into the inlet end of the second adsorption bed at an adsorption pressure in the range from about 15 psig to about 500 psig, and (g) repeating the above steps in a continuous cycle treating the second adsorption bed like the first adsorption bed and the first adsorption bed like the second adsorption bed.

The pressure swing adsorption method of the present invention employing the novel combination of a pressure equalization step, an evacuation and purge step, and a back fill step can be better understood by reference to the apparatus in FIG. 1. Although the present invention is described and illustrated in connection with preferred embodiments, applicant intends that modifications and variations may be used without departing from the spirit of the present invention. For example, any gaseous mixture including, but not limited to air (nitrogen and oxygen), methane and carbon dioxide, and hydrogen and carbon monoxide, may be separated by the method of the present invention. For simplicity, the present method will be described in connection with the separation of air although the method may be used to separate other gaseous mixtures normally separated by the pressure swing adsorption method.

Referring to FIG. 1, two pressure resistant columns, 1 and 2, are filled with beds of adsorbents 3 and 4, respectively. The beds may be filled, for example, with carbon molecular sieve adsorbents suitable for the fractionation of a gaseous mixture, such as nitrogen from air. Column 1 comprises the first adsorption bed and column 2 comprises the second adsorption bed. Columns 1 and 2 are essentially identical to each other as are beds of adsorbents 3 and 4. While FIG. 1 shows columns 1 and 2 in a vertical position, the columns may also be employed in a horizontal position.

Ambient air is fed through air feed conduit 5 to compressor 6. Compressor 6 compresses the air to the adsorption pressure which is then introduced into the inlet end of column 1 or column 2 via air inlet conduit 7 and stop valve (on-off stop valve) 8 or 9, respectively. Stop valve 8 introduces feed air into the inlet end at the bottom of column 1 and stop valve 9 introduces feed air into inlet end at the bottom of column 2.

The feed air may be modified prior to passage into adsorption column 1 or 2 by passing the air through a condenser to remove excess humidity (a relative humidity of 40% or less is preferred). A filter or scrubber may also be employed to remove gases such as carbon dioxide, sulfur dioxide, or nitrogen oxides from the feed air. These purification steps are optional and improve the purity of the product gas and also prolong the useful life of the adsorption beds.

Feed air admitted to column 1 or column 2 is adsorbed into bed of adsorbent, 3 or 4, respectively, to selectively sieve oxygen. Product gas, enriched in nitrogen, is withdrawn from column 1 or column 2 via stop valve 12 or stop valve 13, respectively, and outlet conduit 10 into product reservoir 11. Product gas from reservoir 11 may similarly be back filled into column 1 or column 2 via conduit 10 and stop valve 12 or stop valve 13, respectively.

The product reservoir 11 has an outlet conduit 14 and stop valve 15 for venting product gas. The instantaneous nitrogen flow rate is measured by a mass flow meter and the enriched gas oxygen content is analyzed upstream from the product reservoir.

For evacuation of column 1 or 2, the inlet end of column 1 and the inlet end of column 2 are first vented to the atmosphere and then connected to vacuum pump 17 via outlet conduit 16 and stop valve 18 and stop valve 19, respectively. For pressure equalization, the outlet end of column 1 is connected to the inlet end of column 2 via conduit 20 and stop valves 21 and 24 or to both the inlet end and the outlet end of column 2 via stop valves 21, 23 and 24 and the corresponding conduits. Similarly, the outlet end of column 2 is connected to the inlet end of column 1 via conduit 20 and stop valves 23 and 22 or to both the inlet end and the outlet end of column 1 via stop valves 21, 22 and 23 and the corresponding conduits.

At the start of the pressure swing adsorption cycle, feed air from conduit 5 is compressed in compressor 6 to the adsorption pressure and then passed to the inlet end of column 1 and adsorption bed 3 via conduit 7 and open stop valve 8. The adsorption pressure is in the range from about 15 psig to about 500 psig, preferably from about 50 psig to about 200 psig. Adsorption bed 4 in column 2 is evacuated simultaneously. The feed air is adsorbed in adsorption bed 3 to selectively sieve oxygen. Product gas, enriched in nitrogen and having a predetermined purity, is withdrawn from the outlet end of column 1 via open stop valve 12 and outlet conduit 10 and passed into product reservoir 11. The predetermined purity of the product gas is generally from about 90% to about 99.9%.

When the purity of the enriched gas from the outlet end of column 1 drops from about 0.1% to about 10% below the predetermined purity thereby becoming lean gas, stop valves 8 and 12 are closed stopping the production of product gas. Stop valves 21 and 24 are then opened and, according to a first embodiment of the invention, lean air is then passed from the outlet end of column 1 to the inlet end of column 2 via conduit 20 to substantially equalize the pressure of column 1 and column 2. The pressure of column 2 is in the range from about 25% to about 50%, preferably from about 35% to about 45%, of the adsorption pressure.

When the pressure equalization step is complete, stop valves 21 and 24 are then closed and stop valve 13 is opened. Product gas from reservoir 11 is then passed into the outlet end of column 2 to back fill column 2. The pressure of back filled column 2 is generally in the range from about 50% to about 100%, preferably from about 60% to about 80%, of the adsorption pressure.

When the back fill step is complete, stop valve 9 is opened to admit feed gas from compressor 6 to the inlet end of column 2 and the cycle is repeated.

Column 1 is regenerated by opening stop valves 12 and 18 and venting column 1 to the atmosphere. Column 1 is then evacuated from the inlet end via stop valve 18 to the desorption pressure while enriched gas from product reservoir 11, or alternatively from producing column 2, is passed at the product gas purge rate into the outlet end of column 1 via stop valve 12. In general, the desorption pressure is from about 25 torr to about 350 torr, preferably from about 50 torr to about 250 torr. In general, the product gas purge rate is from about 0.01 1/1/cycle to about 2 1/1/cycle, preferably from about 0.1 1/1/cycle to about 0.8 1/1/cycle.

Hence, when one adsorption bed is producing gas, the other adsorption bed is being regenerated. In general, the time to complete a cycle (cycle time) is in the range from about 30 seconds to about 600 seconds, preferably from about 45 seconds to about 300 seconds.

In the embodiment of the process of the invention described above, equalization of the pressure in columns 1 and 2 following the completion of the nitrogen production step is effected by transferring gas out of the column which has just completed production, via its outlet, and into the column which has just completed regeneration, via its inlet (outlet to inlet pressure equalization). For example, when column 1 has completed its production cycle, and column 2, its regeneration cycle, equalization of columns 1 and 2 is carried out by transferring gas from column 1 to column 2 through valve 21, line 20 and valve 24.

It sometimes happens that the flow of equalization gas into the column which has just completed its evacuation step significantly disturbs the adsorption bed in this column. This results because the sudden rush of high pressure gas into the evacuated bed causes violent levitation of the bed. This is particularly the case when the ratio of the column's diameter to its height is small. The following alternative embodiment of the invention minimizes the disturbance of the beds in columns having such a configuration. In this embodiment, pressure equalization between the two columns following the pressure swing adsorption step is carried out by a variation of the above-described procedure.

According to the procedure of this embodiment, pressure equalization of vessels 1 and 2 is accomplished by transferring gas from the column that has just completed its production step to the column that has just completed its evacuation step by causing the gas to exit out of the former column through its outlet end and enter the latter column by flowing through both its inlet end and its outlet end (outlet to inlet and outlet pressure equalization). The simultaneous flow of pressurizing gas into both the outlet end and the inlet end of the column receiving the gas may take place for the entire duration of the pressure equalization period or for only a part of this period. For example, the gas may continuously flow into the second column through both its inlet end and its outlet end for the entire pressure equalization period or it may flow into the column through both its inlet end and its outlet end for a part of the pressure equalization period and through either its inlet end or the outlet end for the remainder of the equalization period. Any combination of flows is permissible as long as flow to both the column's inlet end and outlet end occurs during some part of the pressure equalization period.

With reference to FIG. 1, the modified pressure equalization of this embodiment may proceed as follows. After column 1 has completed its production step and column 2 has completed its evacuation step, pressure equalization of vessels 1 and 2 can accomplished by closing stop valves 8 and 12 and opening stop valves 21, 23 and 24. Lean gas then flows out of vessel 1 through its outlet end, through open valve 21 and into vessel 2 through both open valves 23 and 24 simultaneously. In the alternate cycle, when vessel 2 has just completed its production step and vessel 1 its evacuation step, stop valves 9 and 13 are closed and stop valves 21, 22 and 23 are opened. This permits gas to flow out of vessel 2 through its outlet end, through open valve 23, and into vessel 1 through both open valves 21 and 22 simultaneously. The modified procedure of this embodiment has the advantage that it permits rapid equalization of vessels 1 and 2 with very little or no disturbance of the bed receiving the pressurizing gas.

In another embodiment, the invention is directed at an apparatus for separating a gaseous mixture to produce an enriched gas having a predetermined purity which comprises:

(a) a first adsorption bed having an inlet end and an outlet end;

(b) a second adsorption bed, connected in parallel to the first adsorption bed, the second adsorption bed having an inlet end and an outlet end;

(c) a source of a gaseous mixture connected to the inlet end of the first adsorption bed by a conduit containing a stop valve and to the inlet end of the second adsorption bed by a conduit containing a stop valve;

(d) a product reservoir connected to the outlet end of the first adsorption bed by a conduit containing a stop valve and to the outlet end of the second adsorption bed by a conduit containing a stop valve;

(e) a vacuum pump connected to the inlet end of the first adsorption bed by a conduit containing a stop valve and to the inlet end of the second adsorption bed by a conduit containing a stop valve for evacuating the first and second adsorption beds;

(f) conduits containing stop valves for passing lean gas from the outlet end of the first adsorption bed into both the inlet end and the outlet end of the second adsorption bed to substantially equalize the pressure of the second adsorption bed and the first adsorption bed; and (g) conduits containing stop valves for passing lean gas from the outlet end of the second adsorption bed into both the inlet end and the outlet end of the first adsorption bed to substantially equalize the pressure of the second adsorption bed and the first adsorption bed.

Throughout this application, various publications have been referenced. The disclosures in these publications are incorporated herein by reference in order to more fully describe the state of the art.

The present invention is further illustrated by the following examples which are presented for the purpose of demonstrating, but not limiting, the method of this invention.

EXAMPLES 1-7

These Examples illustrate the separation of a gaseous mixture to form enriched gas via conventional pressure swing adsorption methods and the pressure swing adsorption method according to the present invention.

Air was separated to form enriched nitrogen via the pressure swing adsorption method at an adsorption pressure of 100 psig, a desorption pressure of 135 torr, a cycle time of 240 seconds, and a specific product gas purge rate of 0.25 1/1/cycle (liters of gas/liters of absorbent/cycle).

Figure 2:
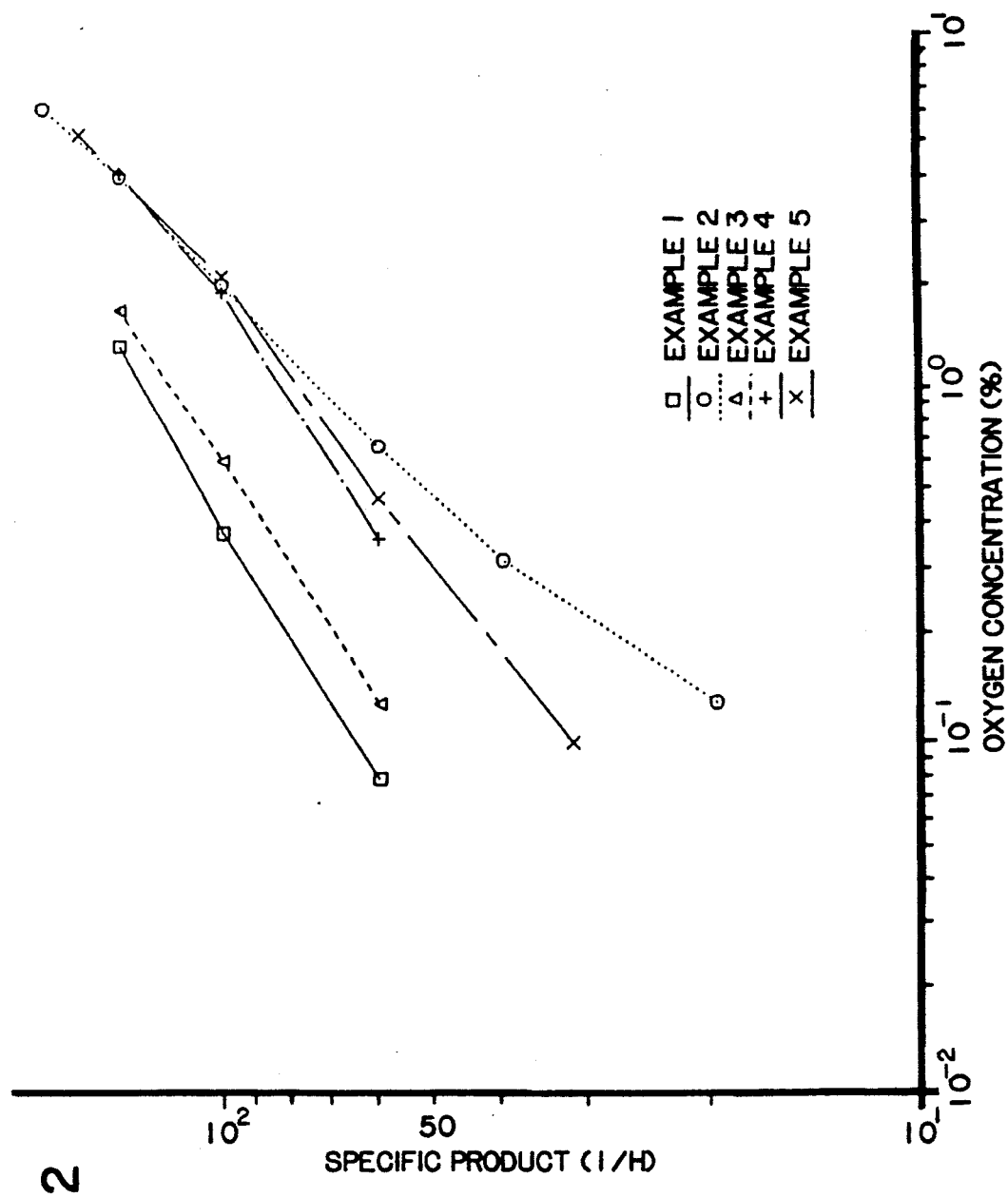
FIG. 2 illustrates in graphic format the specific product of nitrogen obtained versus oxygen concentration when air is separated using various pressure swing adsorption methods. (Examples 1-5).
Figure 3:
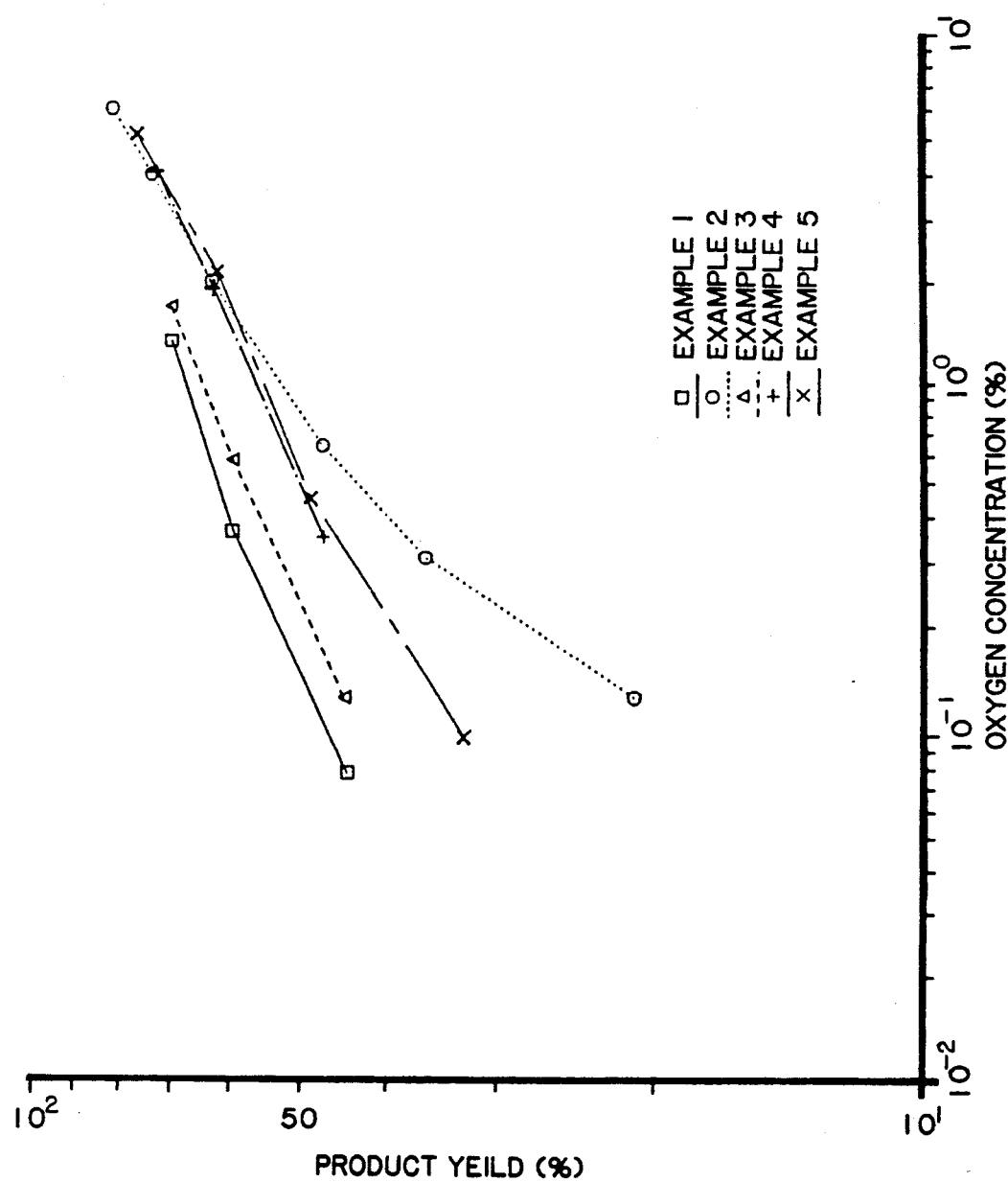
FIG. 3 illustrates in graphic format the product yield of nitrogen obtained versus oxygen concentration when air is separated using various pressure swing adsorption methods. (Examples 1-5).

When air was separated according to the method of the present invention (outlet end-inlet end pressure equalization step, back fill step, and evacuation and purge step) at 99% nitrogen purity, the specific product obtained was 129.2 1/h and the yield of product was 66.5%, Example 1, see FIGS. 2–3. When air was separated in the manner set out above except that the purge step was carried out without evacuation but with only vent to atmosphere pressure, the specific product obtained was 72.2 1/h and the yield of product was 52%, Example 2, see FIGS. 2–3. When air was separated in the manner set out above except that the pressure equalization step was carried out by connecting top-top (outlet end-outlet end) and bottom-bottom (inlet end-inlet end), the specific product was 117.6 1/h and the yield of product was 63.7%, Example 3, see FIGS. 2–3. When air was separated in the manner set out above except that the pressure equalization step was carried out by connecting top-top (outlet end-outlet end) and bottom-bottom (inlet end-inlet end) and the purge step was carried out without evacuation but with only vent to atmosphere pressure, the specific product obtained was 81.7 1/h and the yield of product was 55.5%, Example 4, see FIGS. 2–3. When air was separated in the manner set out above except that the pressure equalization step was carried out by connecting top-top (outlet end-outlet end) and bottom-bottom (inlet end-inlet end), the purge step was carried out without evacuation but with only vent to atmosphere pressure, and the pressurization step was carried out using only lean air and not with a back fill step, the specific product obtained was 77.1 1/h and the yield of product was 54.4%, Example 5, see FIGS. 2/3.

When the pressurization step was carried out using only lean gas, as described in U.S. Pat. No. 4,376,640, and the ultrapressurized vessel was isolated, then vented and evacuated, the specific product obtained was 125.2 1/h and the yield of product was 62.6%.

Figure 4:
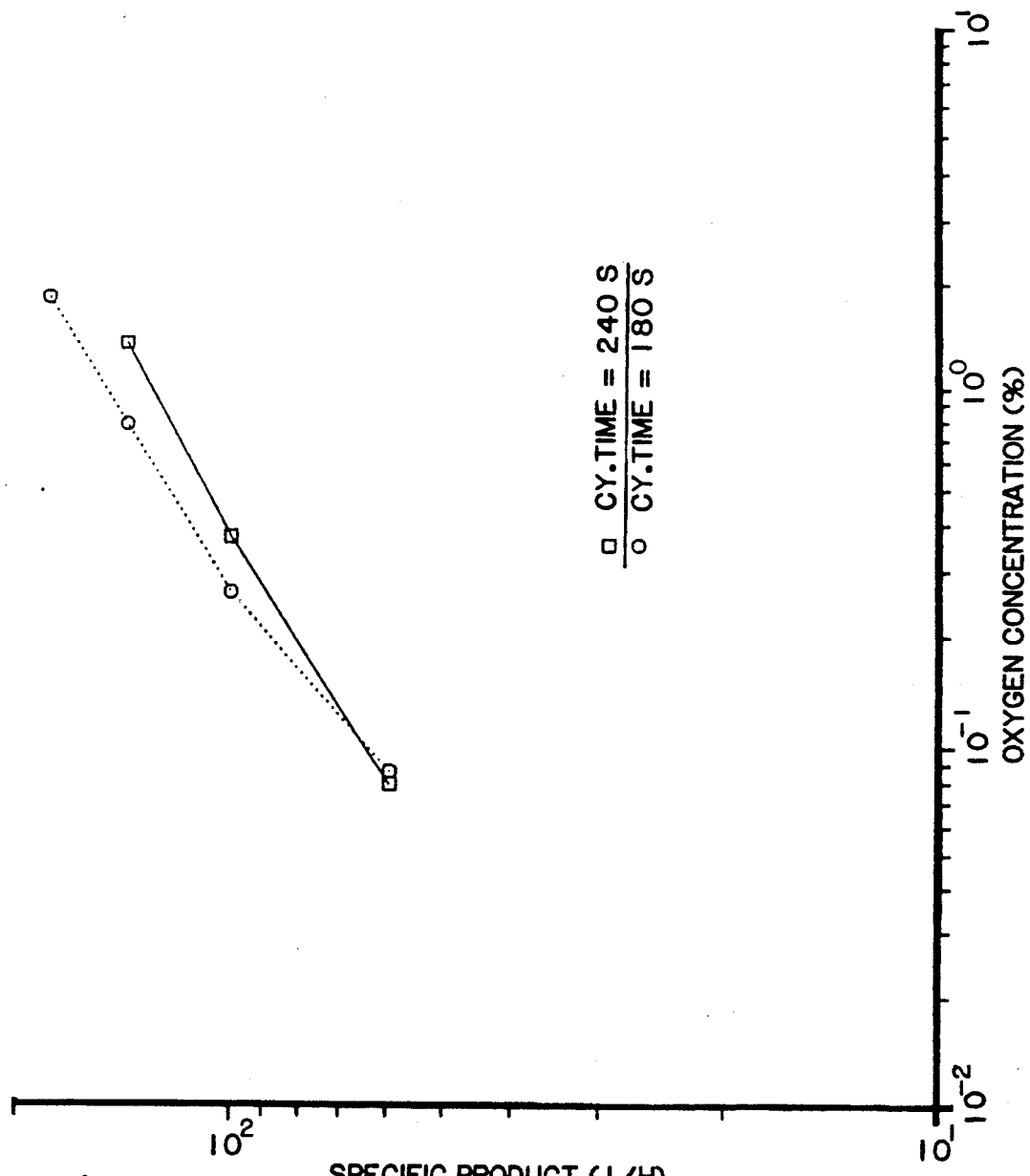
FIG. 4 illustrates in graphic format the specific product of nitrogen obtained versus oxygen concentration when air is separated employing the pressure swing adsorption method of the present invention at cycle times of 180 seconds and 240 seconds. (Example 1).
Figure 5:
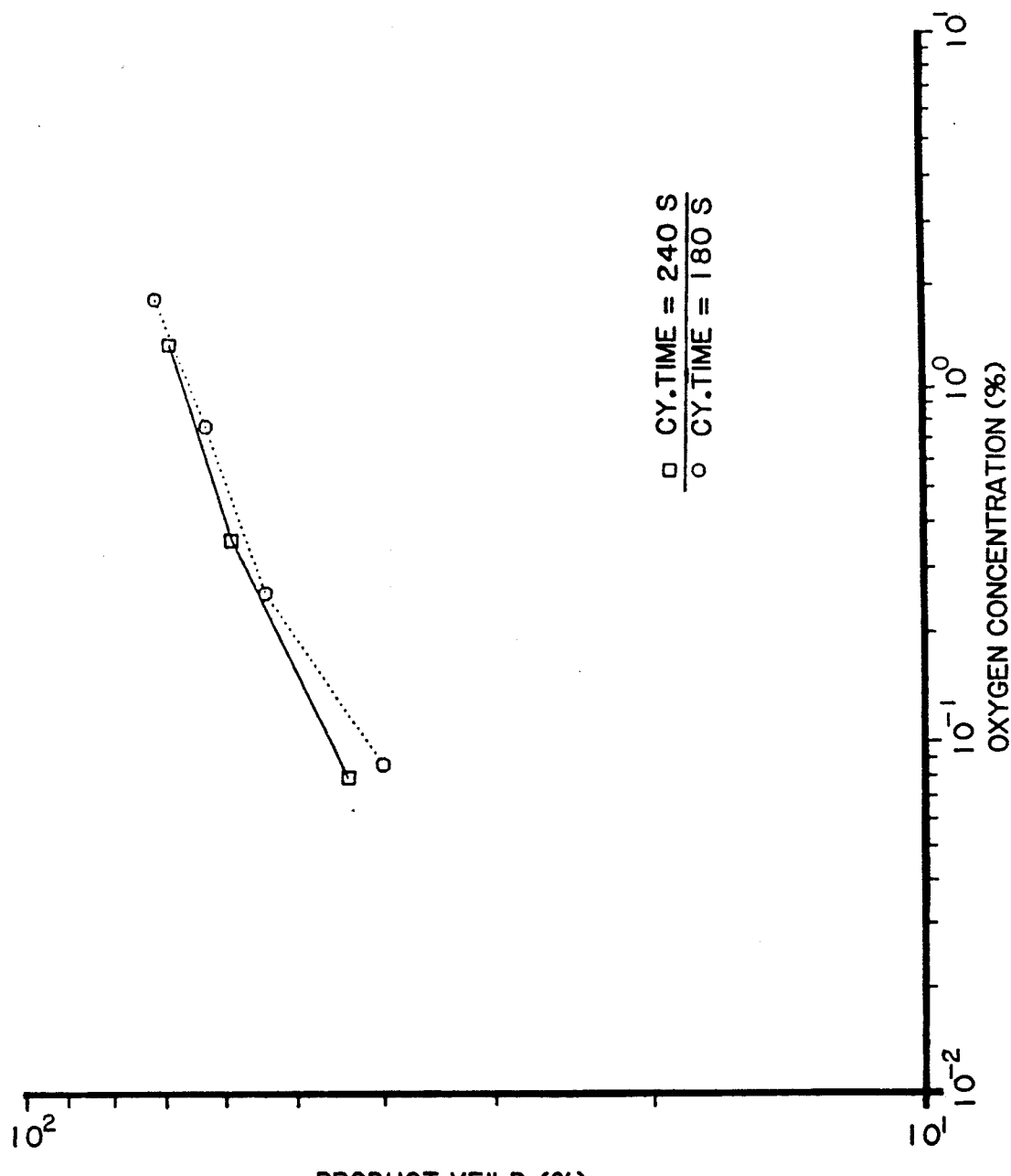
FIG. 5 illustrates in graphic format the product Yield of nitrogen obtained versus oxygen concentration when air is separated employing the pressure swing adsorption method of the present invention at cycle times of 180 seconds and 240 seconds. (Example 1).

When the cycle time for the method of Example 1 was decreased from 240 seconds to 180 seconds, the specific product obtained at 99% nitrogen purity increased to 150.2 1/h and the product yield decreased to 65.3%, see FIGS. 4–5.

Example 6 illustrates the separation of air by the embodiment of the invention in which the equalization step is conducted by transferring gas from the column completing its production step through its outlet and into the column completing its evacuation step through both its inlet and its outlet.

Air was separated to form enriched nitrogen via pressure swing adsorption, at an adsorption pressure of 100 psig, a cycle time of 240 seconds, a specific product gas purge rate of 0.5 1/1/cycle and with desorption at atmospheric pressure. The specific product and product yield were respectively 26.5% and 12.3% greater than the specific product and product yield obtained when the experiment was conducted under identical conditions except that the equalization of the columns was carried out by transferring gas from the outlet end of the column that has just completed its production step and into only the inlet end of the column that has just completed its evacuation step.

In Example 7, the procedure of Example 6 was repeated except that the desorption was carried out at a pressure of 300 torr. The increase in the specific product and the product yield compared to the specific product and product yield obtained by outlet end to inlet end only pressure equalization was 4.4% and 5.2%, respectively.

Accordingly, the improved pressure swing adsorption method for separating gaseous mixtures according to both embodiments of the present invention provides enriched gases in high yield and high purity.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

We claim:

1. An adsorption method for separating air in a plurality of adsorption beds comprising carbon molecular sieves which are operated out of phase with one another to produce a nitrogen-enriched gas having predetermined purity which comprises the steps of:

(a) passing air into an inlet end of one adsorption bed at an adsorption pressure in the range of about 15 psig to about 500 psig while withdrawing nitrogen-enriched gas from the outlet end of said one adsorption bed and collecting the enriched gas as product;

(b) when the purity of the nitrogen-enriched gas from the outlet end of said one adsorption bed drops to about 0.1% to about 10% below said predetermined purity thereby becoming lean gas, stopping the flow of air into said one adsorption bed and passing the lean gas from the outlet end of said one adsorption bed into the inlet end of an other adsorption bed which has just completed step (c) until the pressure of said other adsorption bed is in the range of about 25% to about 50% of the adsorption pressure;

(c) stopping the flow of lean gas from the outlet end of said one adsorption bed and evacuating said one adsorption bed from the inlet end to a desorption pressure of about 25 torr to about 350 torr while purging said one adsorption bed by passing nitrogen-enriched gas product into the outlet end of said one adsorption bed;

(d) partially pressurizing said one adsorption bed by passing lean gas from the outlet end of an other adsorption bed which has just completed step (a) to both the inlet end of said one adsorption bed until the pressure in said one adsorption bed is in the range of about 25% to about 50% of the adsorption pressure;

(e) further pressurizing said one adsorption bed by passing nitrogen-enriched gas into the outlet end of said one adsorption bed to back fill said one adsorption bed until the pressure of the back filled adsorption bed is in the range of about 50% to about 100% of the adsorption pressure;

(f) further pressurizing said one adsorption bed by passing the gaseous mixture into the inlet end of said one adsorption bed at an adsorption pressure in the range of about 15 psig to about 500 psig; and (g) repeating the above steps in a continuous cycle treating each other adsorption bed in said plurality of adsorption beds like said one adsorption bed.

2. The method according to claim 1, wherein in step (c) said one adsorption bed is purged by passing nitrogen-enriched gas product into the outlet end of said one adsorption bed at a purge rate of about 0.01 l/l/cycle to about 1 l/l/cycle.

3. An adsorption method for separating a gaseous mixture in a plurality of adsorption beds operated out of phase with one another to produce an enriched gas having a predetermined purity which comprises the steps of:

(a) passing the gaseous mixture into an inlet end of one adsorption bed at an adsorption pressure in the range of about 15 psig to about 500 psig while withdrawing enriched gas from the outlet end of said one adsorption bed and collecting the enriched gas as product;

(b) when the purity of the enriched gas from the outlet end of said one adsorption bed drops to about 0.1% to about 10% below said predetermined purity thereby becoming lean gas, stopping the flow of gaseous mixture into said one adsorption bed and passing the lean gas from the outlet end of said one adsorption bed into both the inlet end and the outlet end of an other adsorption bed which has just completed step (c) until the pressure of said other adsorption bed is in the range of about 25% to about 50% of the adsorption pressure;

(c) stopping the flow of lean gas from the outlet end of said one adsorption bed and evacuating said one adsorption bed from the inlet end to a desorption pressure of about 25 torr to about 350 torr while purging said one adsorption bed by passing enriched gas product into the outlet end of said one adsorption bed;

(d) partially pressurizing said one adsorption bed by passing lean gas from the outlet end of an other adsorption bed which has just completed step (a) to both the inlet end and the outlet end of said one adsorption bed until the pressure in said one adsorption bed is in the range of about 25% to about 50% of the adsorption pressure;

(e) further pressurizing said one adsorption bed by passing enriched gas into the outlet end of said one adsorption bed to back fill said one adsorption bed until the pressure of the back filled adsorption bed is in the range of about 50% to about 100% of the adsorption pressure;

(f) further pressurizing said one adsorption bed by passing the gaseous mixture into the inlet end of said one adsorption bed at an adsorption pressure in the range of about 15 psig to about 500 psig; and (g) repeating the above steps in a continuous cycle treating each other adsorption bed in said plurality of adsorption beds like said one adsorption bed.

4. The according to claim 3, wherein said adsorption beds comprise carbon molecular sieves.

5. The according to claim 4, wherein the gaseous mixture is air and the enriched gas is nitrogen.

6. The method according to claim 3, wherein in step (c) said one adsorption bed is purged by passing enriched gas product into the outlet end of said one adsorption bed at a purge rate of about 0.01 l/l/cycle to about 2 l/l/cycle.

7. The method according to claim 1 or claim 3, wherein the predetermined purity is from about 90% to about 99.9%.

8. The method according to claim 1 or claim 3, wherein in step (a) the adsorption pressure is in the range of about 50 psig to about 200 psig.

9. The method according to claim 1 or claim 3, wherein in step (b) the pressure of said other adsorption bed after the pressure equalization step is in the range of about 35% to about 45% of the adsorption pressure.

10. The method according to claim 1 or claim 3, wherein in step (c) said one absorption bed is evacuated from the inlet end to a desorption pressure of about 50 torr to about 250 torr.

11. The method according to claim 1 or claim 3, wherein the pressure of said one absorption bed at the end of step (e) is in the range of about 60% to about 80% of the adsorption pressure.

12. The method according to claim 1 or claim 3, wherein the pressure of said one adsorption bed at the end of step (f) is in the range of about 50 psig to about 200 psig.

* * * * *

UNITED STATES PATENT AND TRADEMARK OFFICE
CERTIFICATE OF CORRECTION

PATENT NO. : 5,176,722
DATED : January 5, 1993
INVENTOR(S) : Norberto O. Lemcoff, et al.

It is certified that error appears in the above-indentified patent and that said Letters Patent is hereby corrected as shown below:

Column 10, line 50, delete "both".

Column 10, line 61, delete "the gaseous mixture" and insert --air-- therefor.

Column 12, line 11, insert --method-- before "according".

Column 12, line 13, insert --method-- before "according".

Signed and Sealed this

Nineteenth Day of October, 1993

Attest:

BRUCE LEHMAN

*Attesting Officer*   *Commissioner of Patents and Trademarks*